US012785919B2

(12) United States Patent
Shih et al.

(10) Patent No.: US 12,785,919 B2
(45) Date of Patent: Nov. 3, 2026

(54) NETWORK SYSTEM FOR LONG REACH ETHERNET AND CONTROL METHOD THEREOF

(71) Applicant: FARADAY TECHNOLOGY CORPORATION, Hsinchu City (TW)

(72) Inventors: Wan-Yi Shih, Hsinchu City (TW); Jhen-Yu Hou, Hsinchu City (TW); Ming-Yueh Yeh, Hsinchu City (TW); Shih-Yi Shih, Hsinchu City (TW); Po-Hsuan Lee, Hsinchu City (TW)

(73) Assignee: FARADAY TECHNOLOGY CORPORATION, Hsinchu City (TW)

( * ) Notice: Subject to any disclaimer, the term of this patent is extended or adjusted under 35 U.S.C. 154(b) by 290 days.

(21) Appl. No.: 18/830,635

(22) Filed: Sep. 11, 2024

(65) Prior Publication Data

US 2025/0358090 A1 Nov. 20, 2025

(30) Foreign Application Priority Data

May 14, 2024 (TW) ................................ 113117735

(51) Int. Cl.
*H04L 7/00* (2006.01)
*H04J 3/06* (2006.01)

(52) U.S. Cl.
CPC .......... *H04L 7/0004* (2013.01); *H04J 3/0685* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,824,502 | B2 | 9/2014 | Barkan et al. | |
| 11,757,550 | B2 * | 9/2023 | Iyer et al. | H04J 3/062 370/503 |
| 2019/0319897 | A1 * | 10/2019 | Zhou | H04L 45/28 |
| 2025/0330341 | A1 * | 10/2025 | Zhang | H04L 12/12 |

FOREIGN PATENT DOCUMENTS

| | | | |
|---|---|---|---|
| CN | 116708045 | A | 9/2023 |
| TW | I462527 | B | 11/2014 |
| TW | I500292 | B | 9/2015 |

OTHER PUBLICATIONS

Office Action issued by Taiwan Intellectual Property Office on Nov. 8, 2024.

* cited by examiner

*Primary Examiner* — Hashim S Bhatti
(74) *Attorney, Agent, or Firm* — WPAT, PC

(57) ABSTRACT

A network system for long reach Ethernet and an associated control method are provided. A long reach transceiving specification is additionally designed in the physical layer circuit of the network module in the network system. When two network modules in the network system support this long reach transceiving specification, the data transaction between the two network modules can be selectively implemented according to this long reach transceiving specification in the self-negotiation process. Furthermore, the physical layer circuit in the network module is equipped with a special hardware architecture. In case that both of the two network modules in the network system include the special hardware architecture, the data transaction between the two network modules can be selectively implemented according to this long reach transceiving specification in the self-negotiation process.

11 Claims, 7 Drawing Sheets

NETWORK SYSTEM FOR LONG REACH ETHERNET AND CONTROL METHOD THEREOF

This application claims the benefit of Taiwan application Serial No. 113117735, filed May 14, 2024, the subject matter of which is incorporated herein by reference.

FIELD OF THE INVENTION

The present invention relates to a network system and an associated control method, and more particularly to a network system for long reach Ethernet and an associated control method.

BACKGROUND OF THE INVENTION

FIG. 1A is a schematic circuit block diagram illustrating a network system for Ethernet. The network system 100 includes two network modules 110 and 120 and a transmission medium 130. The two network modules 110 and 120 are connected with the transmission medium 130. In addition, the data transaction between the two network modules 110 and 120 are implemented through the transmission medium 130.

The network module 110 at least includes a physical layer circuit (PHY) 112 and a medium access control circuit (MAC) 116. The physical layer circuit (PHY) 112 and the medium access control circuit (MAC) 116 are in communication with each other to transmit data through a media independent interface (MII) 114. Similarly, the network module 120 at least includes a physical layer circuit (PHY) 122 and a medium access control circuit (MAC) 126. The physical layer circuit (PHY) 122 and the medium access control circuit (MAC) 126 are in communication with each other to transmit data through a media independent interface (MII) 124. Each of the media independent interface (MII) 114 and the media independent interface (MII) 124 is a gigabit media independent interface (GMII) or a reduced media independent interface (RMII). Each of the physical layer circuit (PHY) 112 and the physical layer circuit (PHY) 122 is a gigabit physical layer circuit (GPHY).

The transmission medium 130 is connected between the two physical layer circuits (PHY) 112 and 122. The transmission medium 130 is a network cable. Each of the network modules 110 and 120 further include a controller (not shown) for providing parameters to set the corresponding physical layer circuit (PHY) 112, 122 and the media access control circuit (MAC) 116, 126.

According to the IEEE standard 802.3, the Gigabit physical layer circuit (GPHY) supports the data transfer rate of the 1000BASE-T specification, the 100BASE-Tx X specification and the 10BASE-T/TE specification when the length of the transmission medium 130 is less than or equal to 100 meters. The data transfer rate of the 10BASE-T/TE specification is 10 Mbps. The data transfer rate of the 100BASE-Tx X specification is 100 Mbps. The data transfer rate of the 1000BASE-T specification is 1000 Mbps (1 Gbps). For example, the transmission medium 130 is a network cable containing four pairs of twisted-pair cables.

FIG. 1B is a schematic circuit block diagram illustrating the architecture of a conventional physical layer circuit (PHY). The architecture of the physical layer circuit (PHY) 200 can be applied to each of the two physical layer circuits (PHY) 112 and 122. The physical layer circuit (PHY) 200 is a gigabit physical layer circuit (GPHY).

The physical layer circuit (PHY) 200 includes an analog front-end circuit (AFE) 210, a physical medium attachment circuit (PMA) 220, a physical coding sublayer circuit (PCS) 230 and a media independent interface (MII) 240.

The analog front-end circuit (AFE) 210 is connected with the first terminal of the transmission medium 130. The second terminal of the transmission medium 130 is connected with the physical layer circuit (PHY) of another network module. Furthermore, the media independent interface (MII) 240 is connected with the corresponding media access control circuit (MAC).

The physical medium attachment circuit (PMA) 220 includes a receiver-side physical medium attachment element (Rx PMA) 222 and a transmitter-side physical medium attachment element (Tx PMA) 226.

The physical coding sublayer circuit (PCS) 230 includes a 10M receiver-side physical coding sublayer element (10M Rx PCS) 231, a 100M receiver-side physical coding sublayer element (100M Rx PCS) 232, a 1000M receiver-side physical coding sublayer element (100M Rx PCS) 233, a 10M transmitter-side physical coding sublayer element (10M Tx PCS) 239, a 100M transmitter-side physical coding sublayer element (100M Tx PCS) 238 and a 1000M transmitter-side physical coding sublayer element (1000M Tx PCS) 237. In the above components, 10M, 100M, and 1000M represent different data transfer rates (Mbps).

In case that the physical layer circuit (PHY) 200 is operated according to the 10BASE-T/TE specification, the data path for receiver includes the analog front-end circuit (AFE) 210, the 10M receiver-side physical coding sublayer element (10M Rx PCS) 231 and the media independent interface (MII) 240, and the data path for transmitter includes the media independent interface (MII) 240, the 10M transmitter-side physical coding sublayer element (10M Tx PCS) 239 and the analog front-end circuit (AFE) 210. Under this circumstance, the receiver-side physical medium attachment element (Rx PMA) 222 and the transmitter-side physical medium attachment element (Tx PMA) 226 in the physical medium attachment circuit (PMA) 220 are inactivated. In addition, the 100M receiver-side physical coding sublayer element (100M Rx PCS) 232, the 1000M receiver-side physical coding sublayer element (100M Rx PCS) 233, the 100M transmitter-side physical coding sublayer element (100M Tx PCS) 238 and the 1000M transmitter-side physical coding sublayer element (1000M Tx PCS) 237 in the physical coding sublayer circuit (PCS) 230 are inactivated.

Similarly, in case that the physical layer circuit (PHY) 200 is operated according to the 100BASE-Tx X specification, the data path for receiver includes the analog front-end circuit (AFE) 210, the receiver-side physical medium attachment element (Rx PMA) 222, the 100M receiver-side physical coding sublayer element (100M Rx PCS) 232 and the media independent interface (MII) 240, and the data path for transmitter includes the media independent interface (MII) 240, the 100M transmitter-side physical coding sublayer element (100M Tx PCS) 238 and the analog front-end circuit (AFE) 210.

Similarly, in case that the physical layer circuit (PHY) 200 is operated according to the 1000BASE-T specification, the data path for receiver includes the analog front-end circuit (AFE) 210, the receiver-side physical medium attachment element (Rx PMA) 222, the 1000M receiver-side physical coding sublayer element (100M Rx PCS) 233 and the media independent interface (MII) 240, and the data path for transmitter includes the media independent interface (MII) 240, the 1000M transmitter-side physical coding sublayer element (1000M Tx PCS) 237, the transmitter-side physical medium attachment element (Tx PMA) 226 and the analog front-end circuit (AFE) 210. Generally, when the network system is operated according to the 1000BASE-T specification, the frequency of the clock signal for the receiver-side physical medium attachment element (Rx PMA) 222, the 1000M receiver-side physical coding sublayer element (100M Rx PCS) 233, the 1000M transmitter-side physical coding sublayer element (1000M Tx PCS) 237 and the transmitter-side physical medium attachment element (Tx PMA) 226 is 125 MHz. Consequently, in the transmission medium 130, the data transfer rate of each twisted-pair cable is 250 Mbps, and the data transfer rate of the four pairs of twisted-pair cables can reach 1000 Mbps (1 Gbps).

In case that the physical layer circuits 112 and 122 in the two network modules 110 and 120 of the network system 100 for Ethernet are both gigabit physical layer circuits (GPHY), the network system 100 for Ethernet have an auto-negotiation mechanism. The auto-negotiation mechanism is used to communicate the operation mode between the two network modules 110 and 120 and determine the data transfer rate to implement the data transaction according to the 1000BASE-T specification, the 100BASE-Tx X specification or the 10BASE-T/TE specification. Generally, the auto-negotiation mechanism will first confirm the specifications supported by the two network modules 110 and 120, and then start the training process from the supported highest specification. For example, if both of the network modules 110 and 120 support the 1000BASE-T specification, the training process is performed according to the 1000BASE-T specification. If the network module 110 supports the 1000BASE-T specification and the network module 120 supports the 100BASE-Tx X specification, the training process is performed according to the 100BASE-Tx X specification.

FIG. 1C is a flowchart of a self-negotiation process for a conventional network system. It is assumed that both of the network modules 110 and 120 support the 1000BASE-T specification. When the transmission medium 130 is connected to the two network modules 110 and 120 or the network system 100 is powered on, the self-negotiation process starts, and it is confirmed that both of the network modules 110 and 120 support the 1000BASE-T specification. Firstly, the two physical layer circuits 112 and 122 are trained according to the 1000BASE-T specification (step S162). Then, a step S164 is performed to judge whether the two network modules 110 and 120 are successfully linked (i.e., in a link-up status). If the judging condition of the step S164 is satisfied, the data transaction between the two network modules 110 and 120 is performed according to the 1000BASE-T specification (step S166).

If the judging condition of the step S164 is not satisfied, the two physical layer circuits 112 and 122 are trained according to the 100BASE-Tx X specification (step S172). Then, a step S174 is performed to judge whether the two network modules 110 and 120 are successfully linked (i.e., in the link-up status). If the judging condition of the step S174 is satisfied, the data transaction between the two network modules 110 and 120 is performed according to the 100BASE-Tx specification (step S176).

If the judging condition of the step S174 is not satisfied, the two physical layer circuits 112 and 122 are trained according to the 10BASE-T/TE specification (step S182). Then, a step S184 is performed to judge whether the two network modules 110 and 120 are successfully linked (i.e., in the link-up status). If the judging condition of the step S184 is satisfied, the data transaction between the two network modules 110 and 120 is performed according to the 10BASE-T/TE specification (step S186).

On the other hand, if the judging condition of the step S184 is not satisfied, the step S162 is performed again. Furthermore, if the judging condition of the step S184 is not satisfied after the step S182 of training the two physical layer circuits 112 and 122 according to the 10BASE-T/TE specification many times, it means that the two network modules 110 and 120 are not successfully linked.

Generally, in case that the length of the transmission medium 130 is greater than 100 meters, the operation mode is not defined according to the IEEE standard 802.3. Moreover, in case that the length of the transmission medium 130 is greater than 100 meters, the physical layer circuit (PHY) 112 of the network module 110 and the physical layer circuit (PHY) 122 of the network module 120 will lose sufficient performance. Consequently, the network system cannot be in the link-up status. That is, if the length of the transmission medium 130 is greater than 100 meters, the two network modules 110 and 120 of the network system 100 are unable to be successfully linked through the training procedures of various specifications in the steps S162 to S184 of the self-negotiation process shown in FIG. 1C, or the two network modules 110 and 120 are not successfully linked after the training procedures of various specifications have been performed many times.

SUMMARY OF THE INVENTION

An embodiment of the present invention provides a network system. The network system includes a first network module, a second network module and a transmission medium. The first network module and the second network module are in communication with each other through the transmission medium. The first network module includes a first physical layer circuit and a first medium access control circuit. The first physical layer circuit includes a first analog front-end circuit, a first physical medium attachment circuit, a first physical coding sublayer circuit, a first symbol synchronization circuit, a first media independent interface and a first clock switching circuit. The first analog front-end circuit is connected with a first terminal of the transmission medium. The first physical medium attachment circuit includes a first receiver-side physical medium attachment element and a first transmitter-side physical medium attachment element. The first receiver-side physical medium attachment element is operated according to a first frequency clock signal. The first physical coding sublayer circuit includes a first receiver-side physical coding sublayer element and a first transmitter-side physical coding sublayer element. The first media independent interface is connected with the first media access control circuit. When the first network module is operated according to a first data transfer rate specification, the first clock switching circuit provides the first frequency clock signal to the first receiver-side physical coding sublayer element, the first transmitter-side physical coding sublayer element and the first transmitter-side physical medium attachment element, a data path for receiver in the first physical layer circuit includes the first analog front-end circuit, the first receiver-side physical coding sublayer element and the first media independent interface. A data path for transmitter in the first physical layer circuit includes the first media independent interface, the first transmitter-side physical coding sublayer element and the first analog front-end circuit. When the first network module is operated according to a long reach transceiving specification, the first clock switching circuit provides a second frequency clock signal to the first receiver-side physical coding sublayer element, the first transmitter-side physical coding sublayer element and the first transmitter-side physical medium attachment element. The data path for receiver in the first physical layer circuit includes the first analog front-end circuit, the first receiver-side physical coding sublayer element and the first media independent interface. The data path for transmitter in the first physical layer circuit includes the first media independent interface, the first transmitter-side physical coding sublayer element and the first analog front-end circuit. A frequency of the first frequency clock signal is higher than a frequency of the second frequency clock signal.

Another embodiment of the present invention provides a self-negotiation process for the network system. The self-negotiation process includes the following steps. In a step (b1), if both of the first network module and the second network module support the first data transfer rate specification and the long reach transceiving specification, the first network module and the second network module are trained according to the first data transfer rate specification. In a step (b2), if the first network module and the second network module are successfully linked when the first network module and the second network module are trained according to the first data transfer rate specification, a data transaction between the first network module and the second network module is performed according to the first data transfer rate specification. In a step (b3), if the first network module and the second network module are not successfully linked when the first network module and the second network module are trained according to the first data transfer rate specification, the first network module and the second network module are trained according to the long reach transceiving specification. In a step (b4), if the first network module and the second network module are successfully linked when the first network module and the second network module are trained according to the long reach transceiving specification, the data transaction between the first network module and the second network module is performed according to the long reach transceiving specification.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Generally, in case that the length of the transmission medium in the network system is greater than 100 meters and two network modules are connected through the transmission medium, the operation mode is not defined according to the IEEE standard 802.3. The present invention provides a network system for long reach Ethernet and an associated control method. The network system and the control method are suitable for the transmission medium with a length greater than 100 meters. For example, in case that the length of the transmission medium is greater than 100 meters, it can be regarded as a long-reach network system.

In an embodiment, a long reach transceiving specification is additionally designed in the physical layer circuit (PHY) of the network module. When two network modules support this long reach transceiving specification, the data transaction between the two network modules can be selectively implemented according to this long reach transceiving specification in the self-negotiation process. Furthermore, the physical layer circuit (PHY) in the network module of the present invention is equipped with a special hardware architecture. In case that both of the two network modules of the network system include the special hardware architecture, the data transaction between the two network modules can be selectively implemented according to this long reach transceiving specification in the self-negotiation process.

For example, the manufacturer A designs a special hardware architecture of the present invention in its network module product. If the two network modules of the network system are both designed by the manufacturer A, it can be confirmed that both network modules have the long reach transceiving ability. Consequently, the data transaction between the two network modules can be selectively implemented according to this long reach transceiving specification in the self-negotiation process. On the other hand, if the network module designed by the manufacturer A and the network module designed by the manufacturer B are connected with each other to form a network system, it can be confirmed that one of the network modules does not have the long reach transceiving ability in the self-negotiation process. The self-negotiation process of the network system is similar to that of FIG. 1C. In other words, the data transaction between the two network modules can be implemented according to the long reach transceiving specification of the present invention.

Figure 2:
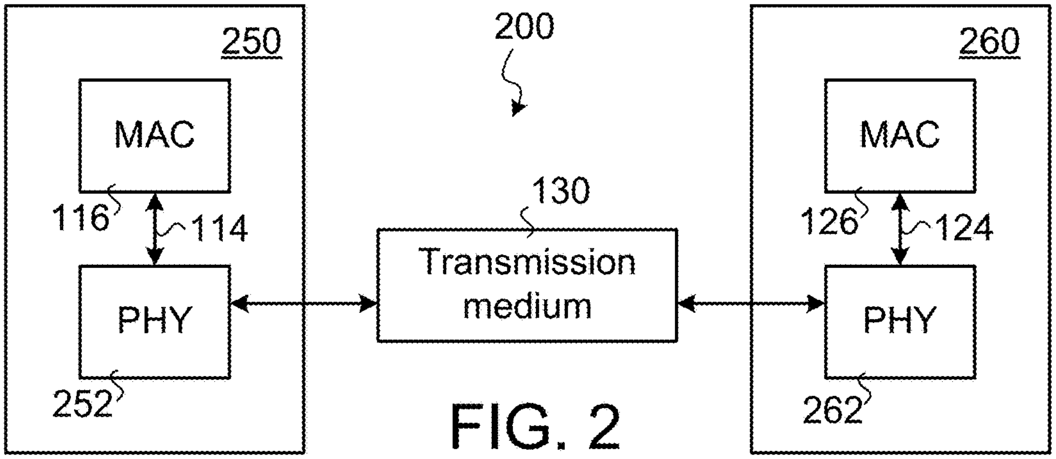
FIG. 2 is a schematic circuit block diagram illustrating a network system for Ethernet according to an embodiment of the present invention.

FIG. 2 is a schematic circuit block diagram illustrating a network system for Ethernet according to an embodiment of the present invention. The network system 200 includes two network modules 250 and 260 and a transmission medium 130. The two network modules 250 and 260 are connected with the transmission medium 130. In addition, the data transaction between the two network modules 250 and 260 are implemented through the transmission medium 130.

The network module 250 at least includes a physical layer circuit (PHY) 252 and a medium access control circuit (MAC) 116. The physical layer circuit (PHY) 252 and the medium access control circuit (MAC) 116 are in communication with each other to transmit data through a media independent interface (MII) 114. Similarly, the network module 260 at least includes a physical layer circuit (PHY) 262 and a medium access control circuit (MAC) 126. The physical layer circuit (PHY) 262 and the medium access control circuit (MAC) 126 are in communication with each other to transmit data through a media independent interface (MII) 124. Each of the media independent interface (MII) 114 and the media independent interface (MII) 124 is a gigabit media independent interface (GMII) or a reduced media independent interface (RMII). Each of the physical layer circuit (PHY) 252 and the physical layer circuit (PHY) 262 is a gigabit physical layer circuit (GPHY).

The transmission medium 130 is connected between the two physical layer circuits (PHY) 252 and 262. The transmission medium 130 is a network cable. Each of the network modules 250 and 260 further include a controller (not shown) for providing parameters to set the corresponding physical layer circuit (PHY) 252, 262 and the media access control circuit (MAC) 116, 126.

Figure 1A:
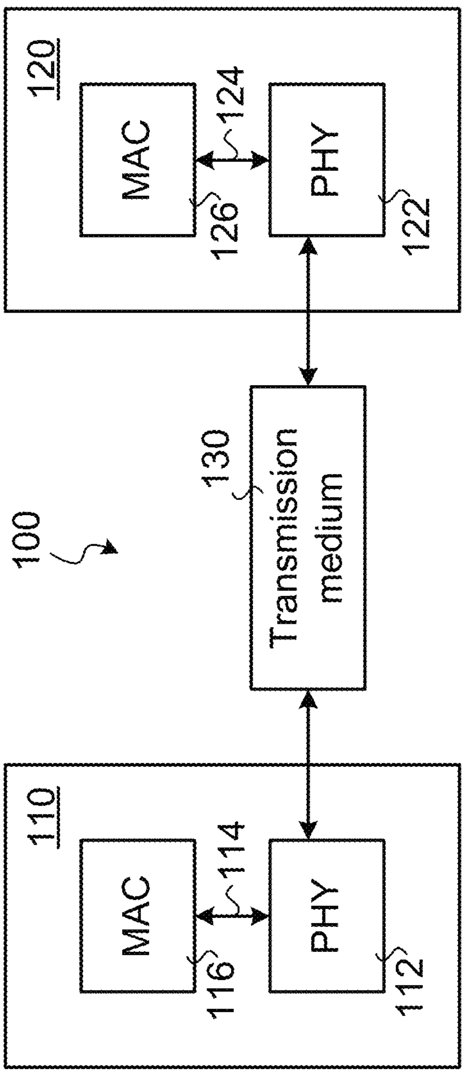
FIG. 1A (PRIOR ART)
FIG. 1A (prior art) is a schematic circuit block diagram illustrating a network system for Ethernet.

When compared with the conventional network system 100 in FIG. 1A, the present invention designs special physical layer circuits (PHY) 252 and 262. That is, without modifying the media access control circuits (MAC) 116 and 126, the data transaction between the two circuit modules 250 and 260 can be implemented according to the 1000BASE-T specification, the 100BASE-Tx X specification, and the 10BASE-T/TE specification. In addition, the data transaction between the two circuit modules 250 and 260 can be implemented according to the long reach transceiving specification.

A self-negotiation process for the network system of the present invention and the architecture of the physical layer circuit (PHY) in the network system of the present invention will be described in more detail as follows.

Figure 3:
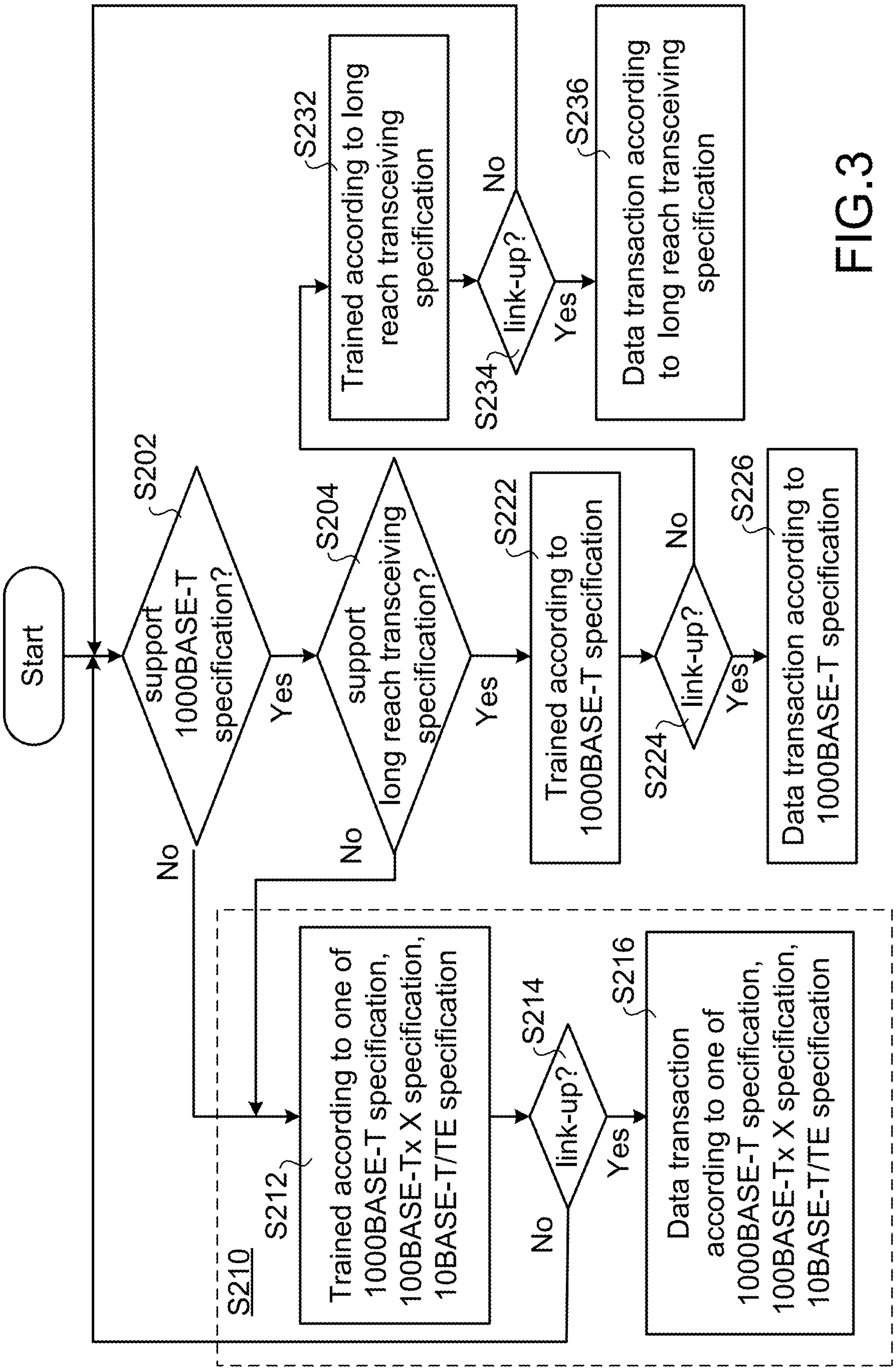
FIG. 3 is a flowchart of a self-negotiation process for the network system according to the embodiment of the present invention.

FIG. 3 is a flowchart of a self-negotiation process for the network system according to the embodiment of the present invention. It is assumed that both of the network modules 250 and 260 support the 1000BASE-T specification.

When the transmission medium 130 is connected to the two network modules 250 and 260 or the network system 200 is powered on, the self-negotiation process starts. Firstly, a step S202 is performed to judge whether the two network modules support the 1000BASE-T specification. If the judging condition of the step S202 is satisfied, a step S204 is performed to judge whether the two network modules support the long reach transceiving specification. The purpose of performing the step S204 is to confirm whether the physical layer circuits (PHY) 252 and 262 in the network modules 250 and 260 are products designed by a manufacturer A.

If the judging result of the step S202 indicates that one of the two network modules 250 and 260 does not support the 1000BASE-T specification or the judging result of the step S204 indicates that one of the two network modules 250 and 260 does not support the long reach transceiving specification, a step S210 is performed. The procedures of the step S210 are similar to the procedures of the conventional self-negotiation process. Firstly, the two network modules 250 and 260 are trained according to one of the 1000BASE-T specification, the 100BASE-Tx X specification and the 10BASE-T/TE specification (step S212). Then, a step S214 is performed to judge whether the two network modules 250 and 260 are successfully linked (i.e., in a link-up status). If the judging condition of the step S214 is not satisfied, the step S202 is performed again. Whereas, if the judging condition of the step S214 is satisfied, the data transaction between the two network modules 250 and 260 is performed according to the trained specification. That is, the data transaction between the two network modules 250 and 260 is performed according to one of the 1000BASE-T specification, the 100BASE-Tx X specification and the 10BASE-T/TE specification (step S216). The detailed procedures of the step S210 may be referred to the self-negotiation process shown in FIG. 1C.

If the judging result of the step S202 indicates that both of the two network modules 250 and 260 support the 1000BASE-T specification and the judging result of the step S204 indicates that both of the two network modules 250 and 260 support the long reach transceiving specification, the two physical layer circuits 252 and 262 are trained according to the 1000BASE-T specification (step S222). Then, a step S224 is performed to judge whether the two network modules 250 and 260 are successfully linked (i.e., in a link-up status). If the judging condition of the step S224 is satisfied, the data transaction between the two network modules 250 and 260 is performed according to the 1000BASE-T specification (step S226).

If the judging condition of the step S224 is not satisfied, it means that the two network modules are in communication with each other through the transmission medium 130 complying with the long reach transceiving specification. That is, the length of the transmission medium 130 is greater than 100 meters. Meanwhile, the two physical layer circuits 252 and 262 are trained according to the long reach transceiving specification (Step S232).

Then, a step S234 is performed to judge whether the two network modules 250 and 260 are successfully linked (i.e., in the link-up status). If the judging condition of the step S234 is satisfied, the data transaction between the two network modules 250 and 260 is performed according to the long reach transceiving specification (step S236). Whereas, if the judging condition of the step S234 is not satisfied, the step S202 is performed again.

As mentioned above, the self-negotiation process shown in FIG. 3 has the following features. If the judging result of the step S204 indicates that both of the physical layer circuits (PHY) 252 and 262 in the network modules 250 and 260 are products designed by the manufacturer A and the judging result of the step S224 indicates that the step S222 of training the two physical layer circuits 252 and 262 according to the 1000BASE-T specification fails, the physical layer circuits (PHY) 252 and 262 in the network modules 250 and 260 are trained according to the long reach transceiving specification (Step S232). After the judging result of the step S234 indicates that the two network modules 250 and 260 are successfully linked (i.e., in the link-up status), the data transaction between the two network modules 250 and 260 is performed according to the long reach transceiving specification (step S236).

For performing the data transaction between the two network modules 250 and 260 according to the long reach transceiving specification, each of the physical layer circuits (PHY) 252 and 262 in the network modules 250 and 260 has a special architecture. The special architecture will be illustrated in more detail as follows.

Figure 4:
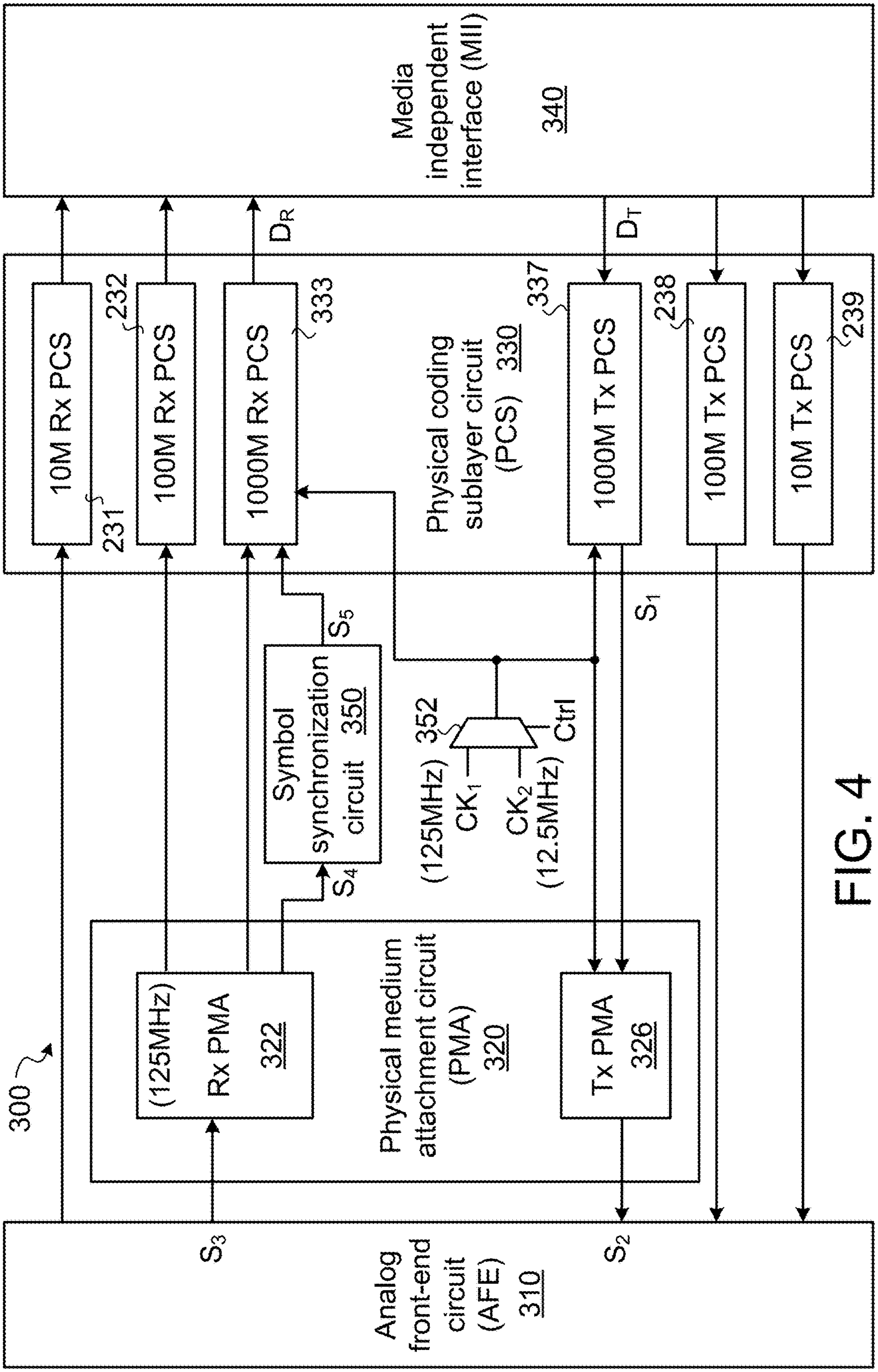
FIG. 4 is a schematic circuit block diagram illustrating the architecture of a physical layer circuit (PHY) according to an embodiment of the present invention.

FIG. 4 is a schematic circuit block diagram illustrating the architecture of a physical layer circuit (PHY) according to an embodiment of the present invention. The architecture of the physical layer circuit (PHY) 300 can be applied to each of the two physical layer circuits (PHY) 252 and 262 of the network system shown in FIG. 2. The physical layer circuit (PHY) 300 is a gigabit physical layer circuit (GPHY).

The physical layer circuit (PHY) 300 includes an analog front-end circuit (AFE) 310, a physical medium attachment circuit (PMA) 320, a physical coding sublayer circuit (PCS) 330 and a media independent interface (MII) 340. In this embodiment, the physical layer circuit (PHY) 300 further includes a symbol synchronization circuit 350 and a clock switching circuit 352.

The analog front-end circuit (AFE) 310 is connected with the first terminal of the transmission medium 130. The second terminal of the transmission medium 130 is connected with the physical layer circuit (PHY) of another network module. Furthermore, the media independent interface (MII) 340 is connected with the corresponding media access control circuit (MAC).

The physical medium attachment circuit (PMA) 320 includes a receiver-side physical medium attachment element (Rx PMA) 322 and a transmitter-side physical medium attachment element (Tx PMA) 326.

The physical coding sublayer circuit (PCS) 330 includes a 10M receiver-side physical coding sublayer element (10M Rx PCS) 231, a 100M receiver-side physical coding sublayer element (100M Rx PCS) 232, a 1000M receiver-side physical coding sublayer element (100M Rx PCS) 333, a 10M transmitter-side physical coding sublayer element (10M Tx PCS) 239, a 100M transmitter-side physical coding sublayer element (100M Tx PCS) 238 and a 1000M transmitter-side physical coding sublayer element (1000M Tx PCS) 337. In the above components, 10M, 100M, and 1000M represent different data transfer rates (Mbps).

The symbol synchronization circuit 350 is connected between the receiver-side physical medium attachment element (Rx PMA) 322 and the receiver-side physical coding sublayer element (100M Rx PCS) 333. According to a clock signal Ctrl, the clock switching circuit 352 provides one of two clock signals $CK_1$ and $CK_2$ to the receiver-side physical coding sublayer element (100M Rx PCS) 333, the 1000M transmitter-side physical coding sublayer element (1000M Tx PCS) 337 and the transmitter-side physical medium attachment element (Tx PMA) 326. The frequencies of two clock signals $CK_1$ and $CK_2$ are different.

For example, the clock switching circuit 352 is a multiplexer. The two input terminals of the multiplexer receive the 125 MHz clock signal $CK_1$ and the 12.5 MHz clock signal $CK_2$, respectively. In case that the physical layer circuit (PHY) 300 is operated according to the 1000BASE-T specification, the clock switching circuit 352 provides the 125 MHz clock signal $CK_1$ to the receiver-side physical coding sublayer element (100M Rx PCS) 333, the 1000M transmitter-side physical coding sublayer element (1000M Tx PCS) 337 and the transmitter-side physical medium attachment element (Tx PMA) 326. In case that the physical layer circuit (PHY) 300 is operated according to the long reach transceiving specification, the clock switching circuit 352 provides the 12.5 MHz clock signal $CK_2$ the receiver-side physical coding sublayer element (100M Rx PCS) 333, the 1000M transmitter-side physical coding sublayer element (1000M Tx PCS) 337 and the transmitter-side physical medium attachment element (Tx PMA) 326.

The clock switching circuit 352 shown in FIG. 4 may be further modified. In another embodiment, the clock switching circuit 352 includes plural multiplexers. For example, the clock switching circuit 352 includes three multiplexers. The clock switching circuit 352 is operated according to a clock signal Ctrl. The two input terminals of each of the three multiplexers receive the 125 MHz clock signal $CK_1$ and the 12.5 MHz clock signal $CK_2$, respectively. The output terminals of the three multiplexers are respectively connected with the receiver-side physical coding sublayer element (100M Rx PCS) 333, the 1000M transmitter-side physical coding sublayer element (1000M Tx PCS) 337 and the transmitter-side physical medium attachment element (Tx PMA) 326.

That is, when the physical layer circuit (PHY) 300 is operated according to the 1000BASE-T specification, the clock switching circuit 352 provides three clock signals with the same frequency (125 MHz) to the receiver-side physical coding sublayer element (100M Rx PCS) 333, the 1000M transmitter-side physical coding sublayer element (1000M Tx PCS) 337 and the transmitter-side physical medium attachment element (Tx PMA) 326, respectively. When the physical layer circuit (PHY) 300 is operated according to the long reach transceiving specification, the clock switching circuit 352 provides three clock signals with the same frequency (12.5 MHz) to the receiver-side physical coding sublayer element (100M Rx PCS) 333, the 1000M transmitter-side physical coding sublayer element (1000M Tx PCS) 337 and the transmitter-side physical medium attachment element (Tx PMA) 326, respectively.

Figure 1B:
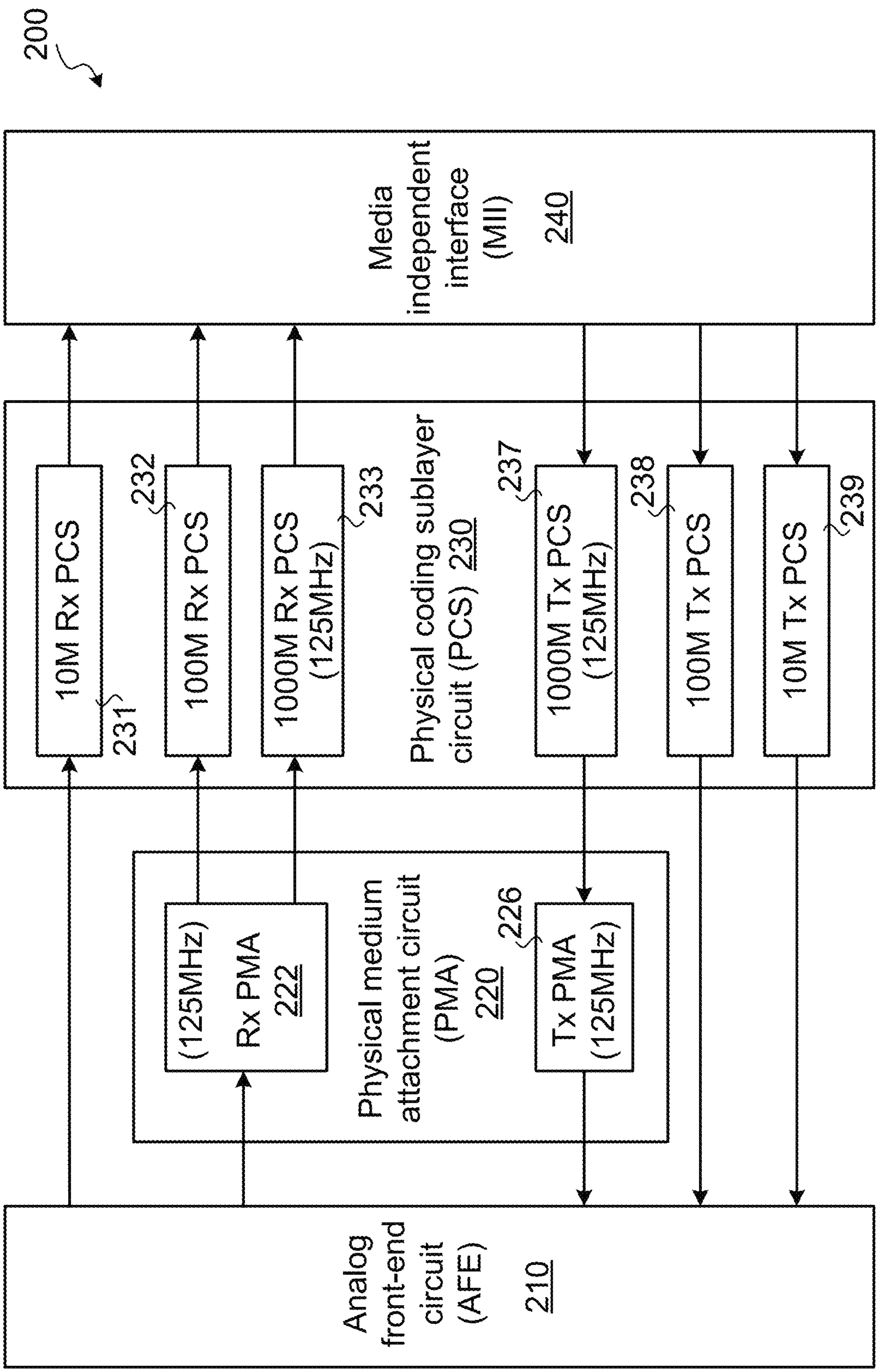
FIG. 1B (PRIOR ART)
FIG. 1B (prior art) is a schematic circuit block diagram illustrating the architecture of a conventional physical layer circuit (PHY)
Figure 1C:
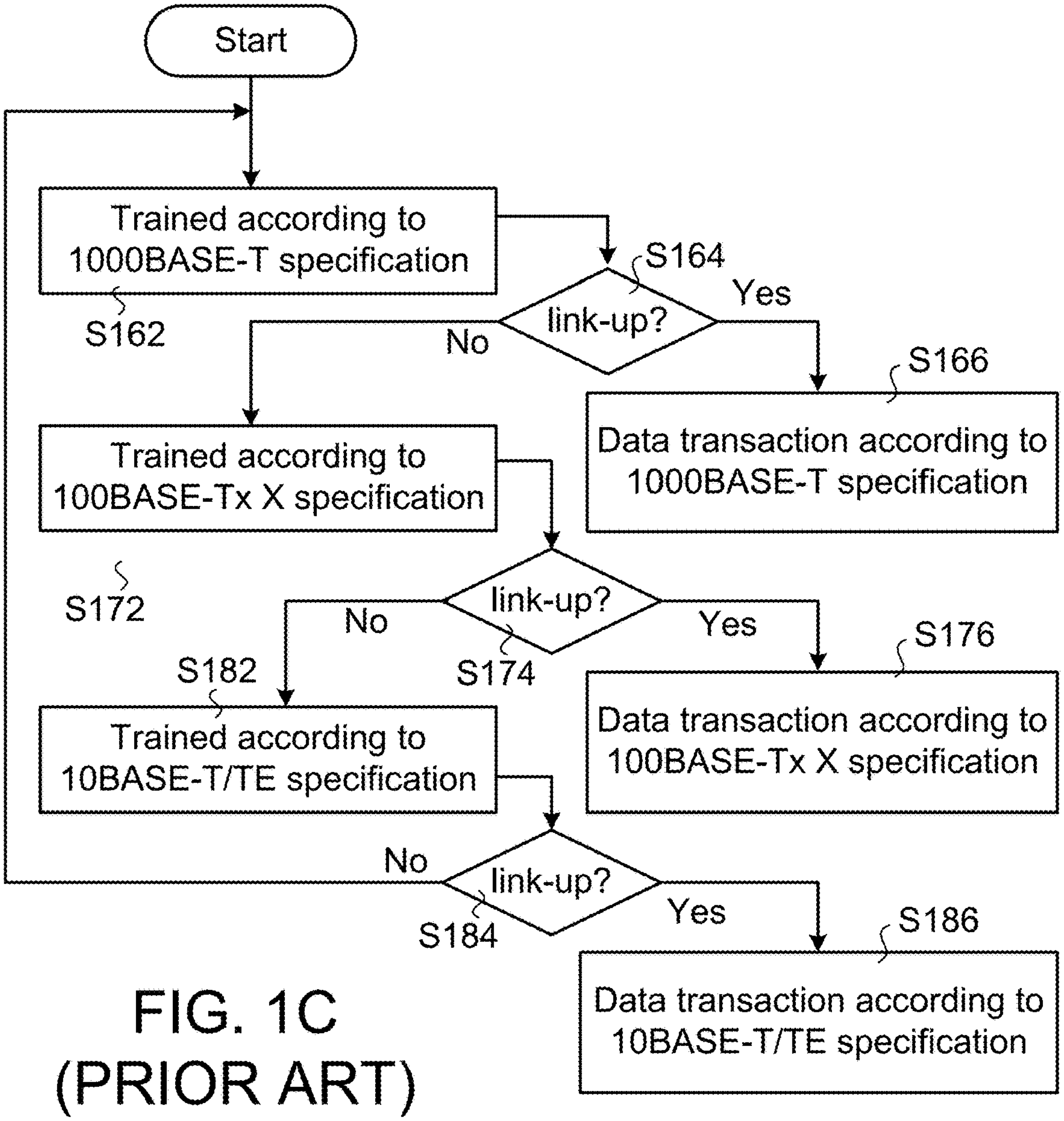
FIG. 1C (PRIOR ART)
FIG. 1C (prior art) is a flowchart of a self-negotiation process for a conventional network system.

Like the physical layer circuit (PHY) 200 shown in FIG. 1B, the physical layer circuit (PHY) 300 supports the 1000BASE-T specification, the 100BASE-Tx X specification and the 10BASE-T/TE specification. Furthermore, the physical layer circuit (PHY) 300 supports the long reach transceiving specification.

In case that the physical layer circuit (PHY) 300 is operated according to the 10BASE-T/TE specification, the data path for receiver includes the analog front-end circuit (AFE) 310, the 10M receiver-side physical coding sublayer element (10M Rx PCS) 231 and the media independent interface (MII) 340, and the data path for transmitter includes the media independent interface (MII) 340, the 10M transmitter-side physical coding sublayer element (10M Tx PCS) 239 and the analog front-end circuit (AFE) 310. The operations of the physical layer circuit (PHY) 300 according to the 10BASE-T/TE specification are similar to the operations of the physical layer circuit (PHY) 200 of FIG. 1B according to the 10BASE-T/TE specification.

In case that the physical layer circuit (PHY) 300 is operated according to the 100BASE-Tx X specification, the data path for receiver includes the analog front-end circuit (AFE) 310, the receiver-side physical medium attachment element (Rx PMA) 322, the 100M receiver-side physical coding sublayer element (100M Rx PCS) 232 and the media independent interface (MII) 340, and the data path for transmitter includes the media independent interface (MII) 340, the 100M transmitter-side physical coding sublayer element (100M Tx PCS) 238 and the analog front-end circuit (AFE) 310. The operations of the physical layer circuit (PHY) 300 according to the 100BASE-Tx X specification are similar to the operations of the physical layer circuit (PHY) 200 of FIG. 1B according to the 100BASE-Tx X specification.

In case that the physical layer circuit (PHY) 300 is operated according to the 1000BASE-T specification, the clock switching circuit 352 provides the 125 MHz clock signal $CK_1$ to the receiver-side physical coding sublayer element (100M Rx PCS) 333, the 1000M transmitter-side physical coding sublayer element (1000M Tx PCS) 337 and the transmitter-side physical medium attachment element (Tx PMA) 326. That is, when the physical layer circuit (PHY) 300 is operated according to the 1000BASE-T specification, the frequency of the clock signal $CK_1$ for the receiver-side physical coding sublayer element (100M Rx PCS) 333, the 1000M transmitter-side physical coding sublayer element (1000M Tx PCS) 337 and the transmitter-side physical medium attachment element (Tx PMA) 326 is 125 MHz. Consequently, in the transmission medium 130, the data transfer rate of each twisted-pair cable is 250 Mbps, and the data transfer rate of the four pairs of twisted-pair cables can reach 1000 Mbps (1 Gbps).

Moreover, in case that the physical layer circuit (PHY) 300 is operated according to the 1000BASE-T specification, the data path for receiver includes the analog front-end circuit (AFE) 310, the receiver-side physical medium attachment element (Rx PMA) 322, the 1000M receiver-side physical coding sublayer element (100M Rx PCS) 333 and the media independent interface (MII) 340, and the data path for transmitter includes the media independent interface (MII) 340, the 1000M transmitter-side physical coding sublayer element (1000M Tx PCS) 337, the transmitter-side physical medium attachment element (Tx PMA) 326 and the analog front-end circuit (AFE) 310. According to the 125 MHz clock signal $CK_1$ from the clock switching circuit 352, the operations of the physical layer circuit (PHY) 300 according to the 1000BASE-T specification are similar to the operations of the physical layer circuit (PHY) 200 of FIG. 1B according to the 1000BASE-T specification.

In case that the physical layer circuit (PHY) 300 is operated according to the long reach transceiving specification, the clock switching circuit 352 provides the 12.5 MHz clock signal $CK_2$ to the receiver-side physical coding sublayer element (100M Rx PCS) 333, the 1000M transmitter-side physical coding sublayer element (1000M Tx PCS) 337 and the transmitter-side physical medium attachment element (Tx PMA) 326.

In other words, when the physical layer circuit (PHY) 300 is operated according to the long reach transceiving specification, only the receiver-side physical medium attachment element (Rx PMA) 322 is still operated according to the 125 MHz clock signal. Although the receiver-side physical coding sublayer element (100M Rx PCS) 333, the 1000M transmitter-side physical coding sublayer element (1000M Tx PCS) 337 and the transmitter-side physical medium attachment element (Tx PMA) 326 have sufficient capability to be operated according to the 125 MHz clock signal $CK_1$. However, in order to ensure the quality of transaction data and ensure the data accuracy through the long reach line, the receiver-side physical coding sublayer element (100M Rx PCS) 333, the 1000M transmitter-side physical coding sublayer element (1000M Tx PCS) 337 and the transmitter-side physical medium attachment element (Tx PMA) 326 will be slowed down and operated according to the 12.5 MHz clock signal $CK_2$. That is, the data transfer rate of the transmission medium 130 between the two network modules 250 and 260 is 100 Mbps.

Please refer to FIG. 4 again. In case that the physical layer circuit (PHY) 300 is operated according to the long reach transceiving specification, the data path for receiver includes the analog front-end circuit (AFE) 310, the receiver-side physical medium attachment element (Rx PMA) 322, the symbol synchronization circuit 350, the 1000M receiver-side physical coding sublayer element (100M Rx PCS) 333 and the media independent interface (MII) 340, and the data path for transmitter includes the media independent interface (MII) 340, the 1000M transmitter-side physical coding sublayer element (1000M Tx PCS) 337, the transmitter-side physical medium attachment element (Tx PMA) 326 and the analog front-end circuit (AFE) 310.

In the data path for transmitter, the transmitting data DT from the medium access control circuit (MAC) is transmitted to the 1000M transmitter-side physical coding sublayer element (1000M Tx PCS) 337 through the media independent interface (MII) 340. After the transmitting data DT is processed by the 1000M transmitter-side physical coding sublayer element (1000M Tx PCS) 337 according to the clock signal $CK_2$ with the lower frequency, a data signal $S_1$ is outputted from the 1000M transmitter-side physical coding sublayer element (1000M Tx PCS) 337 to the transmitter-side physical medium attachment element (Tx PMA) 326. After the data signal $S_1$ is processed by the transmitter-side physical medium attachment element (Tx PMA) 326 according to the clock signal $CK_2$ with the lower frequency, a data signal $S_2$ is outputted from the transmitter-side physical medium attachment element (Tx PMA) 326 to the analog front-end circuit (AFE) 310. In addition, the data signal $S_2$ is transmitted to another network module through the transmission medium 130.

In the data path for transmitter, a data signal $S_3$ from the transmission medium 130 is inputted into the receiver-side physical medium attachment element (Rx PMA) 322. The frequency of the clock signal for the receiver-side physical medium attachment element (Rx PMA) 322 is 125 MHZ, which is ten times the frequency of the 12.5 MHZ clock signal $CK_2$. Consequently, in the data signal $S_3$, each bit of data is sampled ten times by the receiver-side physical medium attachment element (Rx PMA) 322 and transmitted to the symbol synchronization circuit 350 as a data signal $S_4$. After ten different consecutive sampled values in the data signal $S_4$ are summed and averaged by the symbol synchronization circuit 350, plural average signals are obtained. Then, an optimal average signal is selected from the plural average signals. In other words, the symbol synchronization circuit 350 will continuously calculate plural average signals from ten different consecutive sampled values and determine one optimal average signal from the plural average signals as a data signal $S_5$. The data signal $S_5$ is transmitted to the 1000M receiver-side physical coding sublayer element (100M Rx PCS) 333. Since the data signal $S_5$ is obtained from ten different consecutive sampled values by the symbol synchronization circuit 350, it means that the data rate of the data signal $S_5$ has be reduced. After the data signal $S_5$ is processed by the 1000M receiver-side physical coding sublayer element (100M Rx PCS) 333 according to the 12.5 MHz clock signal $CK_2$, a receiving data DR is generated. The receiving data DR is transmitted to the medium access control circuit (MAC) through the media independent interface (MII) 340. The operations of the symbol synchronization circuit 350 will be described as follows.

Figure 5A:
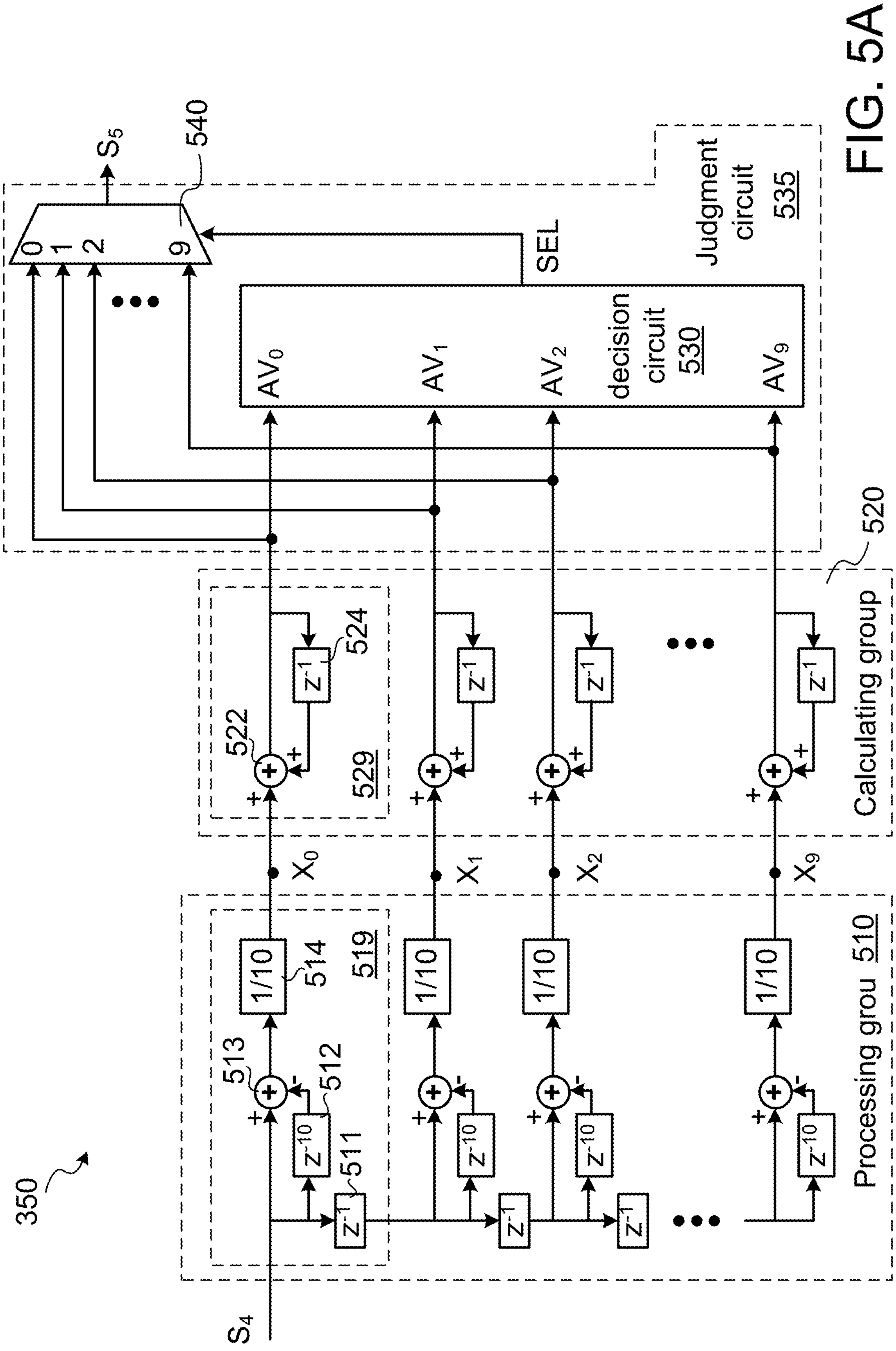
FIG. 5A schematically illustrates the architecture of the symbol synchronization circuit in the physical layer circuit of the network module according to the embodiment of the present invention.
Figure 5B:
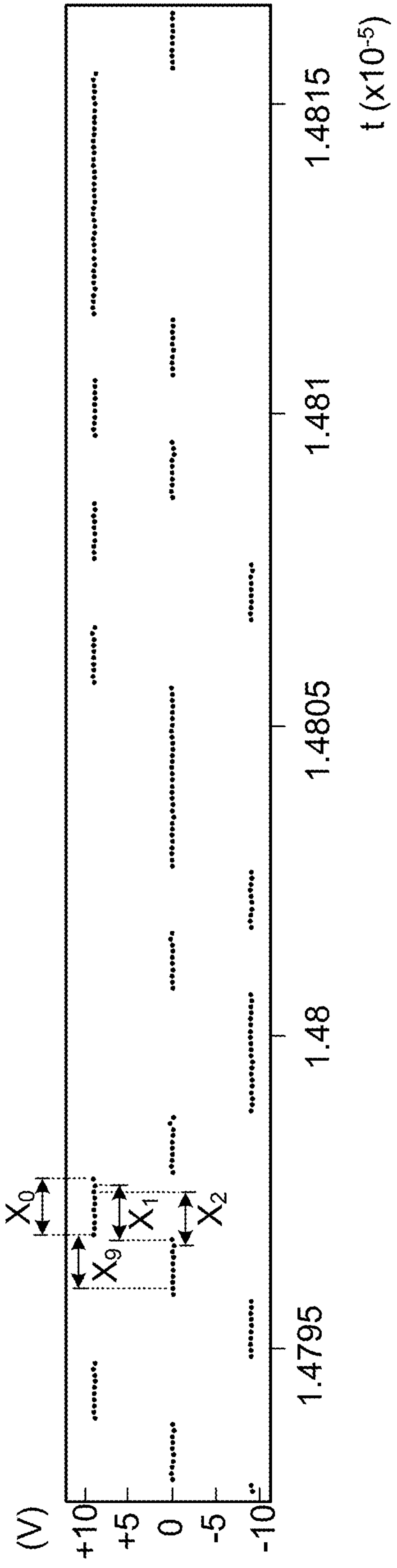
FIG. 5B schematically illustrates associated signals processed by the symbol synchronization circuit.

FIG. 5A schematically illustrates the architecture of the symbol synchronization circuit in the physical layer circuit of the network module according to the embodiment of the present invention. FIG. 5B schematically illustrates associated signals processed by the symbol synchronization circuit.

The symbol synchronization circuit 350 includes a processing group 510, a calculating group 520 and a judgment circuit 535. The judgment circuit includes a decision circuit 530 and a selection circuit 540.

The processing group 510 includes plural processing devices (e.g., M processing devices). Each processing device includes an adder, a first delay unit, a second delay unit and an averaging unit. The number M is determined according to the frequency ratio of the clock signals $CK_1$ and $CK_2$. In an embodiment, M=125 MHz/12.5 MHz=10. That is, the processing group 510 includes 10 processing devices.

For example, in the processing group 510, the uppermost processing device 519 receives the data signal $S_4$ and generates a processing signal $X_0$. The data signal $S_4$ is delayed by one time period through the first delay unit 511 and then transmitted to the next-stage processing device. The adder 513 continuously accumulates the consecutive sampled values in the data signal $S_4$. In addition, the sample value delayed for 10 unit times by the second delay unit 512 is subtracted from the summed result of the consecutive sampled values. In other words, the uppermost processing device sums up ten consecutive sampled values in the data signal $S_4$, and the averaging unit 514 averages the summed result to generate a processed signal $X_0$. Similarly, each of the ten processing devices receives ten different consecutive sampled values, and the ten processing devices generate the corresponding processed signals $X_0$~$X_9$.

The calculating group 520 includes plural calculating devices (e.g., M calculating devices). For example, M is 10. Each calculating device includes an adder and a delay unit. Similarly, the number M is determined according to the frequency ratio of the clock signals $CK_1$ and $CK_2$.

In the calculating group 520, an average signal $AV_0$ is delayed for one unit time by the delay unit 524 of the uppermost calculating device 529. The delayed average signal and the processed signal $X_0$ are added by the adder 522 of the uppermost calculating device 529. Consequently, the average signal $AV_0$ is obtained. The operations of the calculating device 529 are similar to those of an integrator. That is, the calculating device 529 can eliminate large deviations in the processed signal $X_0$ and calculate the average value.

The plural input terminals of the selection circuit 540 receive the average signals $AV_0$~$AV_9$. The decision circuit 530 receives all of the average signals $AV_0$~$AV_9$ and generates a select signal SEL to a select terminal of the selection circuit 540. According to the select signal SEL, one of the average signals $AV_0$~$AV_9$ is selected as the data signal $S_5$ to be transmitted to the 1000M receiver-side physical coding sublayer element (100M Rx PCS) 333. In an embodiment, the decision circuit 530 generates the select signal SEL according to the maximum of the average signals $AV_0$~$AV_9$. For example, if the average signal $AV_0$ is the maximum among the average signals $AV_0$~$AV_9$, the average signal $AV_0$ is selected as the data signal $S_5$ according to the select signal SEL, and the data signal $S_5$ is transmitted to the 1000M receiver-side physical coding sublayer element (100M Rx PCS) 333. In other words, the maximum of the average signals $AV_0$~$AV_9$ is served as the data signal $S_5$ by judgment circuit 535.

In FIG. 5B, ten consecutive sampled values in the data signal $S_4$ are shown. That is, each bit of data in the data signal $S_3$ is sampled ten times by the receiver-side physical medium attachment element (Rx PMA) 322 and transmitted to the symbol synchronization circuit 350 as the data signal $S_4$. In the symbol synchronization circuit 350, the ten processing devices of the processing group 510 continuously collects and processes ten consecutive sampled values as the processed signals $X_0$~$X_9$. The processed signals $X_0$~$X_9$ are transmitted to the calculating group 520.

After the processed signals $X_0$~$X_9$ are respectively calculated by the ten calculating devices of the calculating group 520, the average signals $AV_0$~$AV_9$ are generated. The decision circuit 530 receives the average signals $AV_0$~$AV_9$ and generates the select signal SEL to a select terminal of the selection circuit 540. According to the select signal SEL, the optimal average signal of the average signals $AV_0$~$AV_9$ is selected as the data signal $S_5$.

From the above descriptions, the present invention provides a network system for long reach Ethernet and an associated control method. In the self-negotiation process of the network system, two judging steps are performed to judge whether the two network modules have the long reach transceiving capability. If both of the two network modules have the long reach transceiving capability and the procedure of training the two network modules according to the 1000BASE-T specification fails, the two network modules are trained according to the long reach transceiving specification. After the training procedure is successfully completed, the data transaction between the two network modules is implemented according to the long reach transceiving specification.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network system comprising a first network module, a second network module and a transmission medium, the first network module and the second network module being in communication with each other through the transmission medium, the first network module comprising a first physical layer circuit and a first medium access control circuit, wherein the first physical layer circuit comprises:

a first analog front-end circuit connected with a first terminal of the transmission medium;

a first physical medium attachment circuit comprising a first receiver-side physical medium attachment element and a first transmitter-side physical medium attachment element, wherein the first receiver-side physical medium attachment element is operated according to a first frequency clock signal;

a first physical coding sublayer circuit comprising a first receiver-side physical coding sublayer element and a first transmitter-side physical coding sublayer element;

a first symbol synchronization circuit;

a first media independent interface connected with the first media access control circuit; and a first clock switching circuit, wherein when the first network module is operated according to a first data transfer rate specification, the first clock switching circuit provides the first frequency clock signal to the first receiver-side physical coding sublayer element, the first transmitter-side physical coding sublayer element and the first transmitter-side physical medium attachment element, a data path for receiver in the first physical layer circuit comprises the first analog front-end circuit, the first receiver-side physical coding sublayer element and the first media independent interface, and a data path for transmitter in the first physical layer circuit comprises the first media independent interface, the first transmitter-side physical coding sublayer element and the first analog front-end circuit, wherein when the first network module is operated according to a long reach transceiving specification, the first clock switching circuit provides a second frequency clock signal to the first receiver-side physical coding sublayer element, the first transmitter-side physical coding sublayer element and the first transmitter-side physical medium attachment element, the data path for receiver in the first physical layer circuit comprises the first analog front-end circuit, the first receiver-side physical coding sublayer element and the first media independent interface, and the data path for transmitter in the first physical layer circuit comprises the first media independent interface, the first transmitter-side physical coding sublayer element and the first analog front-end circuit, wherein a frequency of the first frequency clock signal is higher than a frequency of the second frequency clock signal.

2. The network system as claimed in claim 1, wherein the first clock switching circuit provides the first frequency clock signal and the second frequency clock signal, and the first frequency clock signal or the second frequency clock signal is selectively outputted from the first clock switching circuit according to a clock signal.

3. The network system as claimed in claim 1, wherein when the first network module is operated according to a long reach transceiving specification, in the data path for transmitter, a transmitting data from the first medium access control circuit is transmitted to the first transmitter-side physical coding sublayer element through the first media independent interface, wherein after the transmitting data is processed by the first transmitter-side physical coding sublayer element according to the second frequency clock signal, a first data signal is outputted from the first transmitter-side physical coding sublayer element to the first transmitter-side physical medium attachment element, wherein after the first data signal is processed by the first transmitter-side physical medium attachment element according to the second frequency clock signal, a second data signal is outputted from the first transmitter-side physical medium attachment element to the first analog front-end circuit, and the second data signal is transmitted to the second network module through the transmission medium.

4. The network system as claimed in claim 3, wherein when the first network module is operated according to the long reach transceiving specification, in the data path for transmitter, a data signal is transmitted from the first analog front-end circuit to the first receiver-side physical medium attachment element, wherein after the third data signal is processed by the first receiver-side physical medium attachment element according to the first frequency clock signal, a fourth data signal is outputted from the first receiver-side physical medium attachment element to the symbol synchronization circuit, wherein the symbol synchronization circuit receives the fourth data signal and generates a fifth data signal to the first receiver-side physical coding sublayer element, wherein after the data signal is processed by the first receiver-side physical coding sublayer element according to the second frequency clock signal, a receiving data is generated, and the receiving data is transmitted to the first medium access control circuit through the first media independent interface.

5. The network system as claimed in claim 4, wherein the symbol synchronization circuit receives plural consecutive sampled values in the fourth data signal, and the symbol synchronization circuit determines an optimal average signal as the fifth data signal.

6. The network system as claimed in claim 5, wherein the symbol synchronization circuit comprises:

a processing group comprising M processing devices, wherein each processing device receives different consecutive M sampled values, and the M processing devices respectively generate M processed signals;

a calculating group comprising M calculating devices, wherein after the M processed signals from the M processing devices are respectively calculated by the M calculating devices, M average signals are generated; and a judgment circuit receiving the M average signals and selecting an optimal average signal of the M average signals as the fifth data signal, wherein M is equal to a ratio of a frequency of the first frequency clock signal to a frequency of the second frequency clock signal.

7. The network system as claimed in claim 1, wherein the second network module comprising a second physical layer circuit and a second medium access control circuit, and the second physical layer circuit comprises:

a second analog front-end circuit connected with a second terminal of the transmission medium;

a second physical medium attachment circuit comprising a second receiver-side physical medium attachment element and a second transmitter-side physical medium attachment element, wherein the second receiver-side physical medium attachment element is operated according to the first frequency clock signal;

a second physical coding sublayer circuit comprising a second receiver-side physical coding sublayer element and a second transmitter-side physical coding sublayer element;

a second symbol synchronization circuit;

a second media independent interface connected with the second media access control circuit;

a second clock switching circuit, wherein when the second network module is operated according to the first data transfer rate specification, the second clock switching circuit provides the first frequency clock signal to the second receiver-side physical coding sublayer element, the second transmitter-side physical coding sublayer element and the second transmitter-side physical medium attachment element, wherein when the second network module is operated according to the long reach transceiving specification, the second clock switching circuit provides the second frequency clock signal to the second receiver-side physical coding sublayer element, the second transmitter-side physical coding sublayer element and the second transmitter-side physical medium attachment element.

8. A self-negotiation process for the network system according to claim 1, wherein the self-negotiation process comprises steps of:

(b1) if both of the first network module and the second network module support the first data transfer rate specification and the long reach transceiving specification, training the first network module and the second network module according to the first data transfer rate specification;

(b2) if the first network module and the second network module are successfully linked when the first network module and the second network module are trained according to the first data transfer rate specification, performing a data transaction between the first network module and the second network module according to the first data transfer rate specification;

(b3) if the first network module and the second network module are not successfully linked when the first network module and the second network module are trained according to the first data transfer rate specification, training the first network module and the second network module according to the long reach transceiving specification; and (b4) if the first network module and the second network module are successfully linked when the first network module and the second network module are trained according to the long reach transceiving specification, performing the data transaction between the first network module and the second network module according to the long reach transceiving specification.

9. The self-negotiation process as claimed in claim 8, further comprising steps of:

(a1) judging whether both of the first network module and the second network module support the first data transfer rate specification, wherein if both of the first network module and the second network module support the first data transfer rate specification, a step (a2) is performed, wherein if one of the first network module and the second network module does not support the first data transfer rate specification, a step (c1) is performed;

(a2) judging whether both of the first network module and the second network module support the long reach transceiving specification, wherein if both of the first network module and the second network module support the long reach transceiving specification, a step (b1) is performed, wherein if one of the first network module and the second network module does not support the long reach transceiving specification, a step (c1) is performed;

(c1) selecting one of the first data transfer rate specification, a second data transfer rate specification and a third data transfer rate specification as a training specification, and training the first network module and the second network module according to the training specification;

(c2) if the first network module and the second network module are successfully linked when the first network module and the second network module are trained according to the training specification, performing the data transaction between the first network module and the second network module according to the training specification; and (c2) if the first network module and the second network module are not successfully linked when the first network module and the second network module are trained according to the training specification, performing the step (a1) again.

10. The self-negotiation process as claimed in claim 8, wherein if the first network module and the second network module are not successfully linked when the first network module and the second network module are trained according to the long reach transceiving specification, the step (a1) is performed again.

11. The self-negotiation process as claimed in claim 8, wherein the first data transfer rate specification is a 1000BASE-T specification, the second data transfer rate specification is a 100BASE-Tx X specification, and the third data transfer rate specification is a 10BASE-T/TE specification.

* * * * *